US007003522B1

(12) United States Patent  
Reynar et al.

(10) Patent No.: US 7,003,522 B1
(45) Date of Patent: Feb. 21, 2006

(54) SYSTEM AND METHOD FOR INCORPORATING SMART TAGS IN ONLINE CONTENT

(75) Inventors: Jeffrey C. Reynar, Woodinville, WA (US); Ziyi Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 345 days.

(21) Appl. No.: 10/178,680

(22) Filed: Jun. 24, 2002

(51) Int. Cl.
*G06F 17/30* (2006.01)

(52) U.S. Cl. ........................................ 707/10; 707/102
(58) Field of Classification Search .............. 707/1–10, 707/100–104.1, 200–205; 705/28
See application file for complete search history.

(56) References Cited

U.S. PATENT DOCUMENTS

| 4,674,065 A | 6/1987 | Lange et al. ................ 364/900 |
| 5,020,019 A | 5/1991 | Ogawa ........................ 364/900 |
| 5,267,155 A | 11/1993 | Buchanan et al. ..... 364/419.14 |
| 5,337,233 A | 8/1994 | Hofert et al. .......... 364/419.14 |
| 5,351,190 A | 9/1994 | Kondo .................. 364/419.08 |
| 5,392,386 A | 2/1995 | Chalas ........................ 395/155 |
| 5,657,259 A | 8/1997 | Davis et al. ........... 364/715.03 |
| 5,761,689 A | 6/1998 | Rayson et al. .............. 707/533 |
| 5,781,904 A | 7/1998 | Oren et al. ................. 707/100 |
| 5,805,911 A | 9/1998 | Miller ........................ 395/796 |
| 5,815,830 A | 9/1998 | Anthony ........................ 707/6 |
| 5,855,007 A | 12/1998 | Jovicic et al. ................ 705/14 |
| 5,859,636 A | 1/1999 | Pandit ........................ 345/335 |
| 5,875,443 A | 2/1999 | Nielsen .......................... 707/2 |
| 5,892,919 A | 4/1999 | Nielsen .................... 395/200.58 |
| 5,895,461 A | 4/1999 | DeLa Huerga et al. |
| 5,896,321 A | 4/1999 | Miller et al. ........... 365/189.01 |
| 5,900,004 A | 5/1999 | Gipson |
| 5,920,859 A | 7/1999 | Li ................................... 707/5 |
| 5,946,647 A | 8/1999 | Miller et al. .................... 704/9 |
| 5,974,413 A | 10/1999 | Beauregard et al. |
| 6,028,605 A | 2/2000 | Conrad et al. .............. 345/354 |
| 6,085,201 A | 7/2000 | Tso ............................ 707/505 |
| 6,108,674 A | 8/2000 | Murakami et al. .......... 707/515 |
| 6,122,647 A | 9/2000 | Horowitz et al. |
| 6,126,306 A | 10/2000 | Ando .................... 364/419.02 |
| 6,137,911 A | 10/2000 | Zhilyaev .................... 382/225 |
| 6,154,738 A | 11/2000 | Call .............................. 707/4 |
| 6,185,550 B1 | 2/2001 | Snow et al. ................... 707/1 |
| 6,185,576 B1 | 2/2001 | McIntosh .................... 707/200 |
| 6,272,505 B1 | 8/2001 | De La Huerga |
| 6,292,768 B1 | 9/2001 | Chan ............................ 704/1 |
| 6,308,171 B1 | 10/2001 | De La Huerga |

(Continued)

OTHER PUBLICATIONS

P. Hewkin, "Smart tags-the distributed-memory revolution", IEE Review, Jun. 22, 1989, pp. 203-206.*

(Continued)

*Primary Examiner*—Mohammad Ali
(74) *Attorney, Agent, or Firm*—Merchant & Gould

(57) ABSTRACT

A system and method is provided for integrating and executing smart tags in online content for display by a computing application on a client computer without the deployment of client side code. The computing application includes a helper object and a recognizer/action handler. The computing application requests content from one or more cooperating content servers over a communications network. Upon receipt of the content, the computing application executes the helper object to parse the received content for a smart tag list file, related to the received content. After receiving the smart tag list file, the recognizer/action handler incorporates the smart tags and associated actions from the smart tag list file into the document for display to participating users.

18 Claims, 5 Drawing Sheets

U.S. PATENT DOCUMENTS

| | | |
|---|---|---|
| 6,311,177 B1 | 10/2001 | Dauerer et al. ................ 707/2 |
| 6,311,194 B1 | 10/2001 | Sheth et al. ................ 707/505 |
| 6,323,853 B1 | 11/2001 | Hedloy |
| 6,338,059 B1 | 1/2002 | Field et al. .................... 707/4 |
| 6,438,545 B1 | 8/2002 | Beauregard et al. |
| 6,516,321 B1 | 2/2003 | De La Huerga |
| 6,519,603 B1 | 2/2003 | Bays et al. |
| 6,556,984 B1 | 4/2003 | Zien .............................. 707/2 |
| 6,571,241 B1 | 5/2003 | Nosohara ....................... 707/6 |
| 6,618,733 B1 | 9/2003 | White et al. |
| 6,625,581 B1 | 9/2003 | Perkowski .................... 705/27 |
| 6,629,079 B1 | 9/2003 | Spiegel et al. ................ 705/26 |
| 6,697,824 B1 | 2/2004 | Bowman-Amuah ......... 707/229 |
| 6,732,090 B1 * | 5/2004 | Shanahan et al. .............. 707/3 |
| 6,732,361 B1 | 5/2004 | Andreoli et al. ............ 719/313 |
| 2002/0065891 A1 | 5/2002 | Malik .......................... 709/206 |
| 2002/0091803 A1 | 7/2002 | Imamura et al. ............ 709/220 |
| 2002/0184247 A1 * | 12/2002 | Jokela et al. ................ 707/204 |
| 2003/0154144 A1 * | 8/2003 | Pokorny et al. .............. 705/28 |

OTHER PUBLICATIONS

Microsoft Computer Dictionary, Fifth Edition, Microsoft Press, p. 409.
U.S. Appl. No. 10/426,446, filed Apr. 29, 2003, Feinberg.
*Design methodology and formal validation of hypermedia documents*; C.A.S. Santos, L.F.G Soares, G.L. de Souza and J.P. Courtiat; *Proceedings of the sixth ACM international conference on multimedia*, (1998) p. 3948.
*Constructing, organizing, and visualizing collections of tropically related Web resources*; Loren Terveen, Will Hill and Brian Amento; *ACM Trans. Comput.-um. Interact 6*, (Mar. 1999) p. 67-94.
*How to personalize the Web*; Rob Barrett, Paul P. Maglio and Daniel C. Kellem; *Conference proceedings on human factors in computing systems* (1997) p. 75-82.
*CLUES: dynamic personalized message filtering*; Matthew Marx and Chris Schmandt; *Proceedings of the ACM 1996 conference on computer supported cooperative works* (1996) p. 113-121.
*Dynamic hyperlink generation for navigation in relational databases*; Karl M. Goschka and Jurgen Falb;*Proceedings of the tenth ACM conference on hypertext and hypermedia: returning to our diverse roots* (1999) p. 23-24.
*Perceptual user interfaces: perceptual intelligence*; Alex Pentland; *Commun. ACM 43*, 3 (Mar. 2000) p. 35-44.
*Textual context analysis for information retrieval*; Mark A. Stairmand; *Proceedings of the 20th annual international ACM SIGIR conference on research and development in information retrieval* (1997) p. 140-147.
*An XML framework for agent-based E-commerce*; Robert J. Glushko, Jay M. Tenenbaum and Bart Meltzer; Commun. ACM 42, 3 (Mar. 1999) p. 106.
*Technique for Automatically Correcting Words in Text*; Karen Kukich;*ACM Comput. Surv.*, 24, 4 (Dec. 1992); pp. 377-439.
*Putting People First: Specifying Proper Names in Speech Interfaces*, Matt Marx and Chris Schmandt;*Proceedings of the ACM Symposium on User Interface Software and Technology*; 1994; pp. 29-37.
*Interface and execution models in the fluke kernel*; Bryan Ford, Mike Hibler, Jay Lepreau, Roland McGrath and Patrick Tullman; *Proceedings of the third symposium on operating systems design and implementation*, (1999) p. 101-115.
*Exploring the applications user-expertise assessment for intelligent interfaces*; Michel C. Desmarais and Jiming Liu; *Proceedings of the conference on human factors in computing systems*, (1993) p. 308-313.
*Future directions in user-computer interface software*; James D. Foley;*Conference proceedings on organizational computer systems*, (1991) p. 289-297.
*Human-computer interface development: concepts and systems for its management*: H. Rex Hartson and Deborah Hix; *ACM Comput. Surv.* 1 (Mar. 1989) p. 5-92.
*Integrating computer technology, people technology; strategies and case studies from Georgia Tech's Graphics, Visualization and Usability Center*, Jim Foley; *Proceedings of the workshop on advanced visual interfaces*, (1994) p. 34-43.
*Command management system for next-generation user input*; M. Tsai, P. Reiher and G.J. Popek; *Proceedings of the seventh workshop on hottopics in operating systems*, (1999) p. 17984.
U.S. Appl. No. 09/818,157, filed Mar. 27, 2001, entitled "Automatically Adding Proper Names to a Database."
U.S. Appl. No. 09/841,265, filed Apr. 24, 2001, entitled "Method and System for Applying Input Mode Bias."
U.S. Appl. No. 09/841,266, filed Apr. 24, 2001, entitled "Method and System for Providing Electronic Commerce Actions Based on Semantically Labeled Strings."
U.S. Appl. No. 09/906,522, filed Jul. 16, 2001, entitled "Method and System for Providing Restricted Actions for Recognized Semantic Categories."
U.S. Appl. No. 09/906,467, filed Jul. 16, 2001, entitled "Application Program Interfaces for Semantically Labeling Strings and Providing Actions Based on Semantically Labeled Strings."
U.S. Appl. No. 09/907,418, filed Jul. 17, 2001, entitled "Method and System for Defining Semantic Categories and Actions."
U.S. Appl. No. 09/588,411, filed Jun. 6, 2000, entitled "Method and System for Semantically Labeling Strings and Providing Actions Based on Semantically Labeled Strings."
U.S. Appl. No. 10/141,712, filed May 9, 2002, entitled "Method, System, and Apparatus for Converting Dates Between Calendars and Languages Based Upon Semantically Labeled Strings."
U.S. Appl. No. 10/154,630, filed May 23, 2002, entitled "Method, System, and Apparatus for Converting Numbers Based Upon Semantically Labeled Strings."
U.S. Appl. No. 10/140,544, filed May 7, 2002, entitled "Method, System, and Apparatus for Converting Numbers Between Measurement Systems Based Upon Semantically Labeled Strings."
U.S. Appl. No. 10/155,680, filed May 23, 2002, entitled "Method, System, and Apparatus for Converting Currency Values Based Upon Semantically Labeled Strings."
U.S. Appl. No. 10/179,810, filed Jun. 25, 2002, entitled "Method, System, and Apparatus for Performing Custom Actions on Digital Content."
U.S. Appl. No. 10/179,438, filed Jun. 25, 2002, entitled "Method and System for Dynamically Providing Actions Associated with Semantically Labeled Strings."
U.S. Appl. No. 10/184,298, filed Jun. 27, 2002, entitled "Method and System for Associating Actions with Semantic Labels in Electronic Documents."
Willisson, Pace, et al., "UNIX Man Pages: ispell," http://www.comp.lancs.ac.uk/computing/users/eiamjw/unix/chap8.html, http://www.physics.umn.edu/cgi-bin/man-cgi?spell, http://www.vorlesungen.uni-osnabrueck.de/informatik/shellscript/Html/Man/_Man_NeXT_html/ html, http://duplex.hypermart.net/books.bsd/501-504.html, pp. 1-20.

Kuenning, Geoff, "International Ispell," Version 3.1.00, Oct. 8, 1993, http://www.rt.com/man/findaffix.1.html, http://www.csee.usf.edu/cgi-bin/man-cig?ispell, http://fmg-www.cs.ucla.edu/geoff/ispell.html, pp. 1-33.

Kuenning, Geoff, "Ispell, v. 3.1," http://theochem.ki.ku.dk/on_line_docs/ispell_1.html, pp. 1-6.

"UNIX Man Pages: sed," http://www.calpoly.edu/cgi-bin/man-cgi?spell+1, pp. 1-14.

McMahon, Lee. E., "SED—A Non-Interactive Text Editor," Bell Laboratories, Murray Hill, New Jersey 07974, pp. 1-15.

Beitner, N.D.; Hall, W.; Goble, C.A., "Multimedia Support and Authoring in Microcosm: An Extended Model," Dept. of Electronics and Computer Science, Univ. of Southampton, Southampton SO17 IBJ, UK; Dept. of Computer Science, Univ. of Manchester, Oxford Road, Manchester MI3 9PL, UK, pp. 1-12.

IBM Corporation, IBM Research Disclosure #368; "Multimedia Hyperlinks Automatically Created For Reference Documents," *IBM Technical Disclosure* Bulletin, Jun. 1993, pp. 1-5.

*The Complete LINUX™ Operating System 5.2 Deluxe*, Red Hat,® Macmillian Digital Publishing USA, A Viacom Company, Red Hat Software, Inc., ISBN 1-57595-199-1B, pp. 1-385.

*User Manual For AddressMate and AddressMate Plus*, CoStar Corporation, AddressMate Software, 1994-1995, pp. 1-210.

*Getting Results With Microsoft® Office 97, Real World Solutions For The Work You Do*, Microsoft Corporation, pp. 1-703.

*InfoCentral™ 7*, User's Manual, Corel Corporation, vol. 1, Version 7.0, 1996, pp. 1-86.

Corel® Office Professional 7 Quick Results User's Manual, vol. 1, Version 7.0 (first printing), Corel Corporation, Limited, pp. 1-531.

Novell GroupWise User's Guide for Windows 16-Bit Version 5.2, Novell, Inc., 1993-1997, pp. 1-231.

Novell GroupWise User's Guide for Windows 32-Bit Version 5.2, Novell, Inc., 1998, pp. 1-318.

Claris Em@iler Getting Started User's Guide, For Macintosh, Claris Corporation, 1995-1997.

Developer's Guide To Apple Data Detectors, For Version 1.0.2., Apple Computer, Inc., 1997, pp. 1-33.

Apple Data Detectors User's Manual, Apple Computer, Inc., 1997, pp. 1-15.

Nardi, Bonnie A.; Miller, James R.; Wright, David J., "Collaborative, Programmable Intelligent Agents," Jim Miller/Miramontes Computing, Apple Computer Advanced Technology Group, Mar. 1998, pp. 1-11.

\* cited by examiner

SYSTEM AND METHOD FOR INCORPORATING SMART TAGS IN ONLINE CONTENT

FIELD OF THE INVENTION

The present invention relates to a system and method for incorporating smart tags into online content.

BACKGROUND OF THE INVENTION

As online content delivery and interaction has become ubiquitous, online service providers have developed and are continuing to develop features to distinguish themselves from each other. From personalized content pages to highly interactive multi-media content, a variety of online features are currently being offered in the battle to attract new users and to retain existing users. These features are generally integrated within the offered content, however, some features may operate as independent applications (e.g., chat dialog boxes) that cooperate with offered content. These features are designed with the thought that in operation they engage participating users to request additional content.

Currently, several features are automatically integrated in offered content. These schemes have been implemented for automatically integrating associations for initiating these described online functions, features, and operations. Exemplary functions, features, and operations may include automatically addressing an e-mail message, performing a look up in a cooperating database, providing a hyperlink to one or more Internet web pages, and providing enhanced content.

One current scheme for integrating features in offered content involves incorporating associated (or "smart") tags and links in online content such as web pages. Smart tags allow users to select individual words, phrases, or names offered by an online content server that are viewable on the display screen of a client computer cooperating with the content server. The incorporation and execution of smart tags in online content is generally realized through a string of communications between a computing application on the client computer that displays the content (and corresponding smart tags) and the content server housing and generating the desired content. In operation, content may be requested by a participating user through a computing application from a content server. The content server, in response, may aggregate relevant content for distribution to the requesting computing application. Upon receipt of the content, the computing application parses the received content and compares it against a data file (which must be downloaded to the client computer), containing a predefined list of words, phrases, names, and actions to determine if one or more smart tags are to be incorporated into the received content to generate displayable content. After the comparison, the generated displayable content is offered to display and interaction to participating users. For example, using this scheme, if the string "Barry Bonds" is incorporated as a smart tag, user selection of the text "Barry Bonds" may result in a short biography of the baseball player Barry Bonds to be automatically called up from a local, cooperating data file on the client computer and displayed to the participating user.

However, current schemes for incorporating and executing smart tags in online content are limited in that they require the deployment of code to the client computer. That is, under current schemes, users must download a file to the client computer (e.g., from the content server or another computer in a network) containing the list of terms to be recognized as smart tags and defining smart tag actions that are relevant to the online content. This client side deployment directly impacts participating users' navigation and interaction experiences by forcing them to contend with download messages and security warnings inherent in the download process. Additionally, once the user navigates away from the online content, the user has to remove the deployed code on the computer that was only relevant to the previous online content. Finally, changes may be made to the online content, requiring the user to download additional code reflecting the changes.

Therefore, it is appreciated that there exists a need for a system and methods that integrate and employ smart tags in online content without the need to deploy client side code.

SUMMARY OF THE INVENTION

Illustrative embodiments of the present invention provide a system and method that allow for the integration, distribution, and execution of smart tags in online content, for display by a computing application residing on a client computer of a networked computing environment, without the deployment of client side code. In an illustrative embodiment, the computing application comprises a helper object and a recognizer/action handler. In operation, the computing application requests content from one or more cooperating content servers over a communications network. Upon receipt of the content, the computing application executes the helper object to parse the received content for an embedded smart tag list file (or alternatively, a link to smart tag list file), related to the received content. After receiving the smart tag list file, the recognizer/action handler incorporates the smart tags and associated actions from the smart tag list file into the document for display to participating users.

In operation, if a smart tag is interacted with by participating users, one or more events may occur. Exemplary events may comprise the display of a dialog box offering interactive enhanced content, the execution of one or more cooperating computing applications, etc.

In addition to the just described benefits, other advantages of the present invention will become apparent from the detailed description which follows hereinafter when taken in conjunction with the accompanying drawing figures.

BRIEF DESCRIPTION OF THE DRAWINGS

The system and methods for the integration, display, and operation of smart tags in online content are further described with reference to the accompanying drawings in which.

DETAILED DESCRIPTION OF ILLUSTRATIVE EMBODIMENTS

Exemplary Operating Environment

Figure 1:
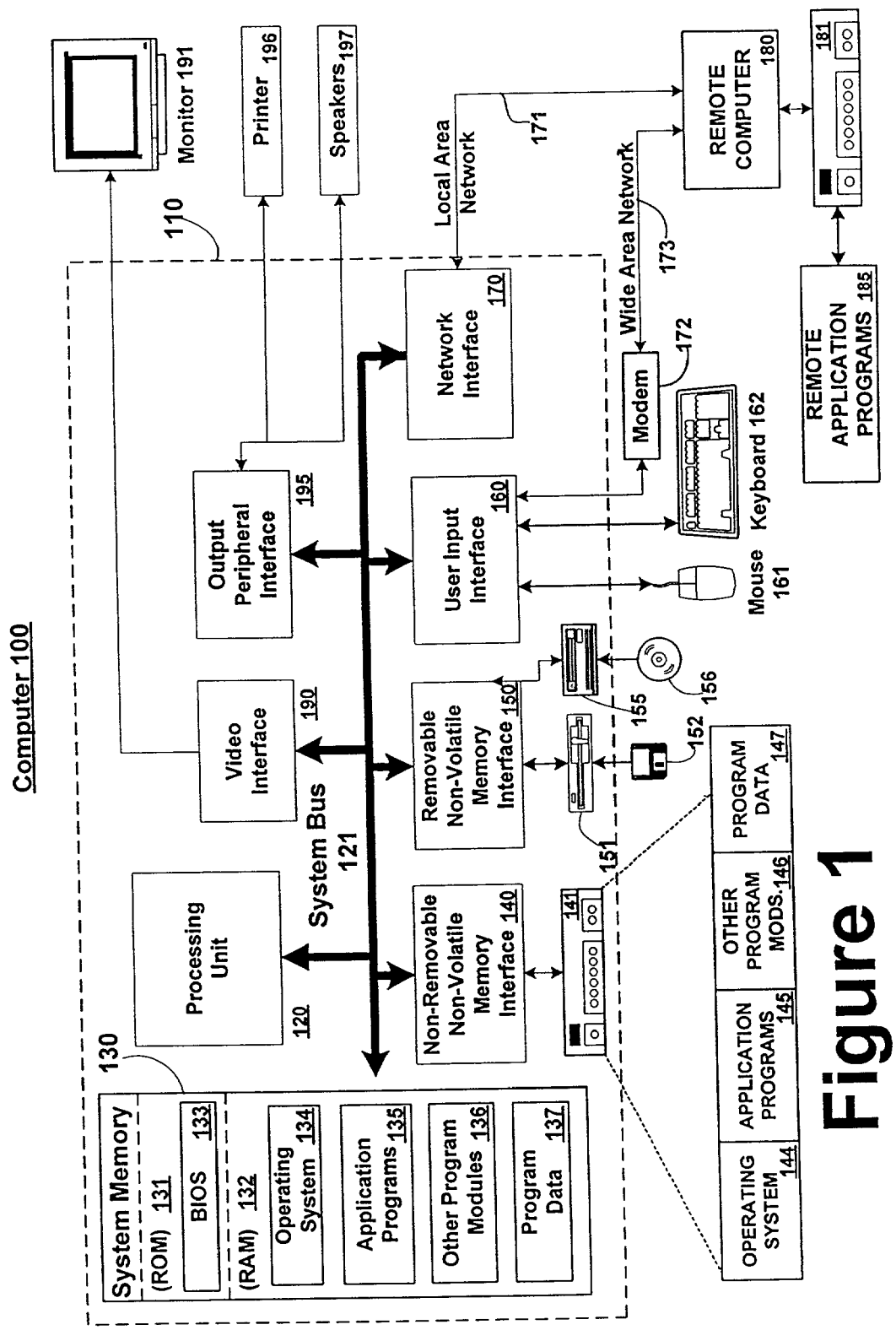
FIG. 1 is a block diagram representing an exemplary computing environment in which the present invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Network Environments

One of ordinary skill in the art can appreciate that a computer 100 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having access to appropriate classification data.

Figure 2:
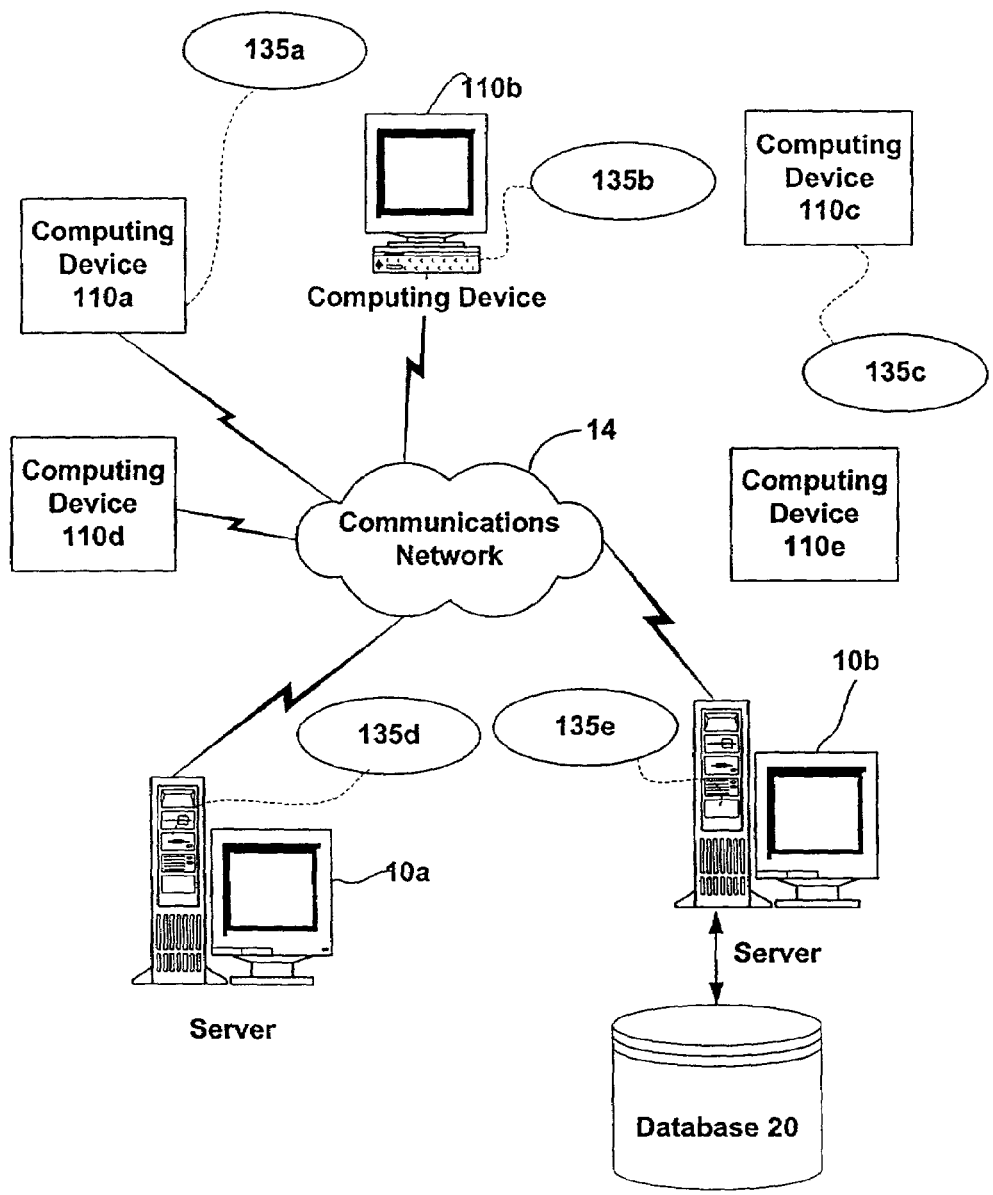
FIG. 2 is a block diagram representing an exemplary computing network environment in which the present invention may be implemented.

FIG. 2 illustrates an exemplary network environment, with a server in communication with client computers via a network, in which the present invention may be employed. As shown, a number of servers 10a, 10b, etc., are interconnected via a communications network 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, and the like in accordance with the present invention. It is thus contemplated that the present invention may apply to any computing device in connection with which it is desirable to provide classification services for different types of content such as music, video, other audio, etc. In a network environment in which the communications network 14 is the Internet, for example, the servers 10 can be Web servers with which the clients 110a, 110b, 110c, 110d, 110e, etc. communicate via any of a number of known protocols such as hypertext transfer protocol (HTTP). Communications may be wired or wireless, where appropriate. Client devices 110 may or may not communicate via communications network 14, and may have independent communications associated therewith. For example, in the case of a TV or VCR, there may or may not be a networked aspect to the control thereof. Each client computer 110 and server computer 10 may be equipped with various application program modules 135 and with connections or access to various types of storage elements or objects, across which files may be stored or to which portion(s) of files may be downloaded or migrated. Any server 10a, 10b, etc. may be responsible for the maintenance and updating of a database 20 in accordance with the present invention, such as a database 20 for storing classification information, music and/or software incident thereto. Thus, the present invention can be utilized in a computer network environment having client computers 110a, 110b, etc. for accessing and interacting with a computer network 14 and server computers 10a, 10b, etc. for interacting with client computers 110a, 110b, etc. and other devices 111 and databases 20.

Defining Smart Tag Terms and Actions

The present invention, in one embodiment, uses an XML (eXtensible Markup Language) schema to define a list of terms to be recognized as smart tags. The XML schema in an embodiment of the present invention is also referred to herein as a smart tag list schema. The XML schema may be written using any editing tool or XML schema editing tool to create an instance of the schema. An instance of the semantic category list schema is also referred to herein as a smart tag list file.

Typically, in preparing the smart tag list file, the user completes all of the properties of the XML schema and specifies the list of terms to recognize directly in the XML schema. In addition to specifying terms directly in the XML schema, the user may use a binary representation of the list of terms because of size constraints. A binary representation of the list has at least two advantages: the size of the XML schema file is smaller because a Trie structure is used to compress the list of terms and searching the binary file is faster than searching a non-binary file. The user may also define actions in the smart tag list file. To be useful to the broadest range of end users, semantic categories placed into documents should be associated with some actions. In recognition of this, the invention, in one embodiment, not only makes it easy to specify lists of terms that should be recognized but also makes it easy to supply one or more actions to be associated with those recognized terms. For example, an action to open a web browser program module and navigate to a particular URL may be specified in the schema.

Smart Tag List File

In one embodiment of the present invention, each smart tag list file adheres to a smart tag list schema. The schema specifies the XML tag names allowed or required in the list file and their syntax. The smart tag list file in Table 1 below is for recognizing a list of bands. The list file comprises the names of music bands (i.e., U2, Oasis, Barenaked Ladies) to be recognized and defines an action giving the user the opportunity to select a URL to find information about a specific band. In this embodiment, the smart tag list file is embedded in the header of a web page:

TABLE 1

```
<html xmlns:o="urn:schemas-microsoft-com:office:office"
xmlns:w="urn:schemas-microsoft-com:office:word"
xmlns="http ://www.w3.org/TR/REC-html40">
<head>
<xml>
<FL:smarttaglist xmlns:FL="urn:schemas-microsoft-com:smarttags:list">
        <FL:name>Band name recognizer</FL:name>
        <FL:lcid>1033,0</FL:lcid>
        <FL:description>A list of bands for recognition.</FL:description>
        <FL:updateable>false</FL:updateable>
        <FL:smarttag type="urn:schemas-microsoft-
com:office:smarttags#bands">
        <FL:caption>Band</FL:caption>
        <FL:terms>
<FL:termlist>
Oasis,U2,Barenaked Ladies
</FL:termlist>
</FL:terms>
<FL:actions>
<FL:action id="cdnowlookup">
<FL:url>http://www.cdnow.com/cgi-
bin/mserver/SID=1412413327/pagename=/RP/CDN/FIND/discography.
html/ArtistID={TEXT}
</FL:url>
<FL:caption>Look up &Band at CDNOW. . .</FL:caption>
</FL:action>
        </FL:actions>
</FL:smarttag>
</FL:smarttaglist>
</xml>
<meta http-equiv=Content-Type content="text/html; charset=windows-
1252">
<link rel=Original-File href=Document16>
<meta name=ProgId content=Word.Document>
<meta name=Generator content="Microsoft Word 10">
<meta name=Originator content="Microsoft Word 10">
<link rel=File-List href="Document16_files/filelist.xml">
<!--[if gte mso 9]><xml>
<o:DocumentProperties>
<o:Author>Jeff Reynar</o:Author>
<o:Revision>1</o:Revision>
<o:TotalTime>0</o:TotalTime>
<o:Created>2001-08-19T00:24:00Z</o:Created>
<o:Pages>1</o:Pages>
<o:Words>2</o:Words>
<o:Characters>13</o:Characters>
<o:Company>Microsoft Corporation</o:Company>
<o:Lines>1</o:Lines>
<o:Paragraphs>1</o:Paragraphs>
<o:CharactersWithSpaces>14</o:CharactersWithSpaces>
<o:Version>10.2625</o:Version>
</o:DocumentProperties>
</xml><![endif]--><!--[if gte mso 9]><xml>
<w:WordDocument>
<w:View>Normal</w:View>
<w:Zoom>0</w:Zoom>
<w:GrammarState>Clean</w:GrammarState>
<w:Compatibility>
<w:BreakWrappedTables/>
<w:SnapToGridInCell/>
<w:ApplyBreakingRules/>
<w:WrapTextWithPunct/>
<w:UseAsianBreakRules/>
<w:UseFELayout/>
</w:Compatibility>
<w:BrowserLevel>MicrosoftInternetExplorer4</w:BrowserLevel>
</w:WordDocument>
</xml><![endif]-->
<style>
<!--
/* Font Definitions */
```

TABLE 1-continued

```
@font-face
    {font-family:SimSun;
    panose-1:2 1 6 0 3 1 1 1 1 1;
    mso-font-alt:?????????????????¡§?????????;
    mso-font-charset:134;
    mso-generic-font-family:auto;
    mso-font-pitch:variable;
    mso-font-signature:3 135135232 16 0 262145 0;}
@font-face
    {font-family:"\@SimSun";
    panose-1:2 1 6 0 3 1 1 1 1 1;
    mso-font-alt:"\@Arial Unicode MS";
    mso-font-charset:134;
    mso-generic-font-family:auto;
    mso-font-pitch:variable;
    mso-font-signature:3 135135232 16 0 262145 0;}
/* Style Definitions */
p.MsoNormal, li.MsoNormal, div.MsoNormal
    {mso-style-parent:"";
    margin:0in;
    margin-bottom:.0001pt;
    mso-pagination:widow-orphan;
    font-size:12.0pt;
    font-family:"Times New Roman";
    mso-fareast-font-family:SimSun;}
@page Section1
    {size:8.5in 11.0in;
    margin:1.0in 1.25in 1.0in 1.25in;
    mso-header-margin:.5in;
    mso-footer-margin:.5in;
    mso-paper-source:0;}
div.Section1
    {page:Section1;}
-->
</style>
<!--[if gte mso 10]>
<style>
/* Style Definitions */
table.MsoNormalTable
    {mso-style-name:"Table Normal";
    mso-tstyle-rowband-size:0;
    mso-tstyle-colband-size:0;
    mso-style-noshow:yes;
    mso-style-parent:"";
    mso-padding-alt:0in 5.4pt 0in 5.4pt;
    mso-para-margin:0in;
    mso-para-margin-bottom:.0001pt;
    mso-pagination:widow-orphan;
    font-size:10.0pt;
    font-family:"Times New Roman";}
</style>
<![endif]-->
</head>
<body lang=EN-US style='tab-interval:.5in'>
<div class=Section1>
<p class=MsoNormal>This is a test</p>
</div>
</body>
</html>
```

Of course, it is not required that the smart tag list file be embedded in the header of the web page. In another embodiment of the present invention, a URL which directs the user to the location of the smart tag list file for the online content (e.g., on another content server) may be embedded in the header as well. The elements of the exemplary smart tag list file of Table 1 will be described below.

Smart Tag List Schema

The smart tag list file of Table 1 adheres to a smart tag list schema in accordance with an embodiment of the present invention. The elements of the smart tag list schema are individually described below.

smarttaglist—a schema namespace declaration.

name—a user-friendly name for this semantic category recognizer.

lcid—a comma separated list of "LocaleIDs" or language identifiers of languages in which items in the list will be recognized If the value of this tag is *, 0 or is not specified, it is assumed that the list works in all locales. Sometimes the host application does not specify the lcid and, in that case, the value is ignored. In some applications, language auto-detection determines what the language is.

description—a longer string that describes this semantic category.

updateable—a Boolean flag that specifies whether this list is updateable. If this element is not specified, it is assumed that the list is not updateable.

smarttag type—a unique namespace, specified as namespaceURI#tagname. The namespaceURI ensures that the smarttag type is globally unique and unambiguous. Two semantic categories with the same tag name can therefore be differentiated using namespaces. For example, two booksellers may use the tagname "Books" as long as they use different namespace URIs.

caption—specifies the title caption for the semantic category to be displayed.

terms—a collection of terms to recognize.

termlist—the contents of this element should be a comma-separated list of terms to be recognized.

actions—a list of new or revised action identifiers.

action—this element has one attribute called id. id is a required alphanumeric string that uniquely identifies the action that applies to a particular type label.

url—specifies the URL to activate for an action. The URL supports a number of tokens that serve as parameters to the HTTP fire. These tokens are described in further detail below.

caption—an action caption.

One of the more important properties defined in the smart tag list file is the tag name (the tag name is the attribute contained within the "FL:smarttag type" tag). Here, the list provider can specify which tag name they would like to recognize the terms in. This gives list providers the flexibility to define custom smart tags that they can mix and match with different actions.

In one embodiment of the present invention, web page navigation actions may be specified in the smart tag list file. More than one action can be supplied per smart tag list file by adding more than one <FL:action> tag within the <FL:actions> collection.

In one embodiment, the present invention may replace tokens in the supplied URL with data that is specific to the smart tag being acted upon. In effect, it enables parameterized URLs to be used. The tokens are URL encoded so as to work in most browsers. In one embodiment, the present invention supports the following tokens:

{TEXT}—this token is replaced with the semantic category value. For example, for a stock ticker symbol {TEXT} might be "MSFT";

{TAG}—this token is replaced with the tag name for the semantic category; and

{LCID}—an integer corresponding to the user's current UI language lcid.

Figure 3:
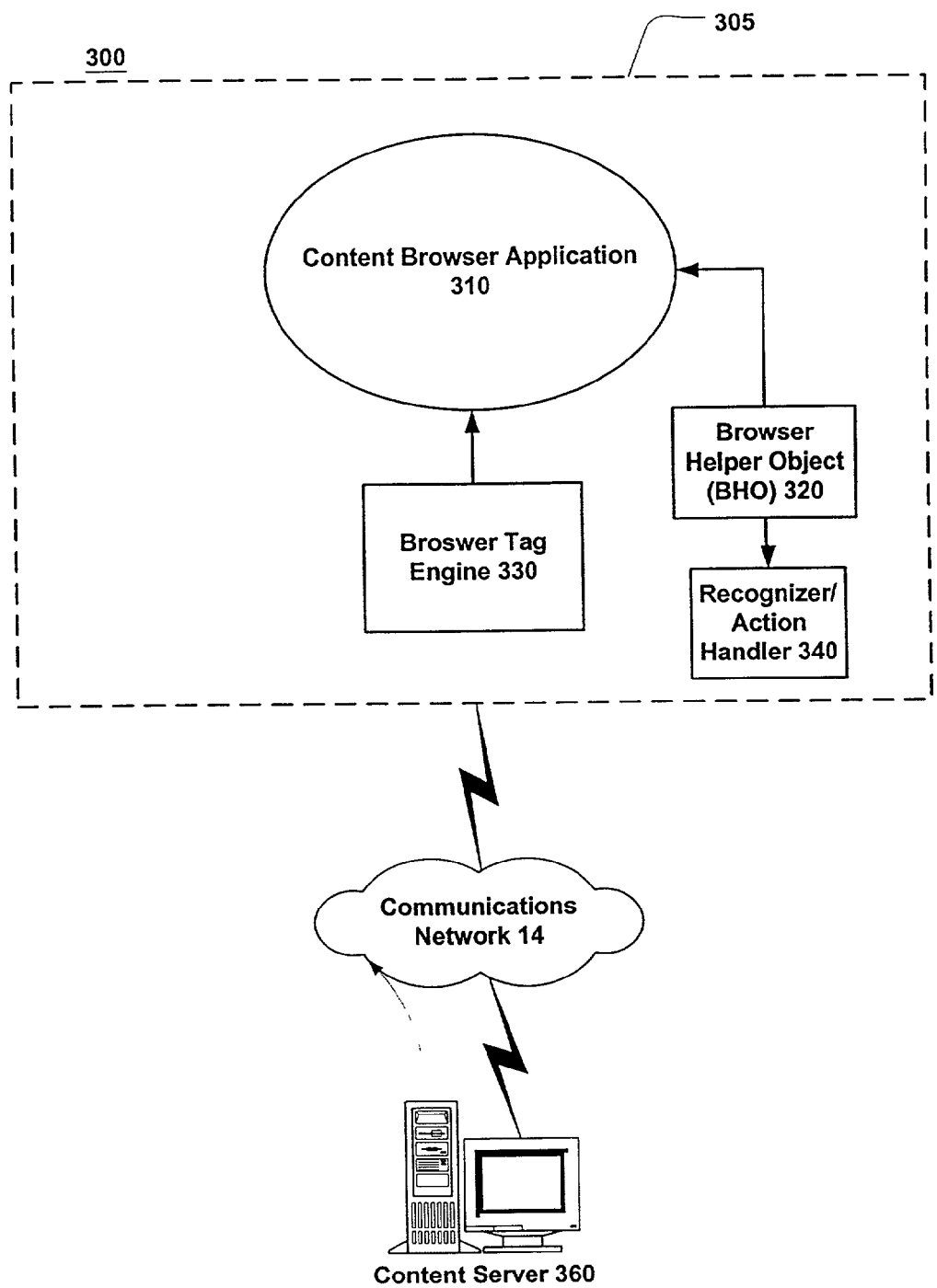
FIG. 3 is a block diagram of exemplary components and their cooperation of a system that integrates, displays, and operates smart tags links in accordance with the present invention.

Referring now to FIG. 3, the cooperation of system components employed to realize smart tag functionality for online content is shown. As shown, system 300 comprises a client side operational block 305. Contained within client side operational block 305 are content browser computing application 310, browser helper object 320, browser tag engine 330, and recognizer/action handler 340. Client side operational block 305 communicates with content server 360 over communications network 14 such that data may be freely communicated between content browser computing application 310 and content server 360.

In operation, participating users (not shown) cooperate with content browser computing application 310 to request content. Computing application passes the content request over communications network 14 to content server 360. In response, content server aggregates and/or generates (dynamically) content to satisfy the content request. The aggregated content is then communicated to content browser computing application 310 for display to participating users (not shown). Content browser computing application processes the aggregated content using browser tag engine 330. Browser helper object 320 parses the aggregated content received from content server to determine the presence of a smart tag list file in the form of an XML tag, for example, or a URL pointing to the location of the file. In addition to parsing the received aggregated content, browser helper object 320 sends the smart tag list file to recognizer/action handler 340 for incorporating the smart tags and associated actions into received content.

In an illustrative implementation, client side operational block 305 comprises MICROSOFT® Corporation's INTERNET EXPLORER® (IE) content browser computing application cooperating with browser helper object 310 and IE's Tags Recognizer Engine. It is understood that although the MICROSOFT® INTERNET EXPLORER® is used to describe some operations of the invention, that such browser is merely exemplary as the present invention contemplates the use of various browser-type computing applications capable of displaying online content and smart tags. It should also be understood that use of the browser helper object is just one extensibility mechanism for use with smart tags. It is contemplated that other extensibility mechanisms may be used in IE or another web browser or non-browser applications such as a word processing document or a spreadsheet.

Figure 4:
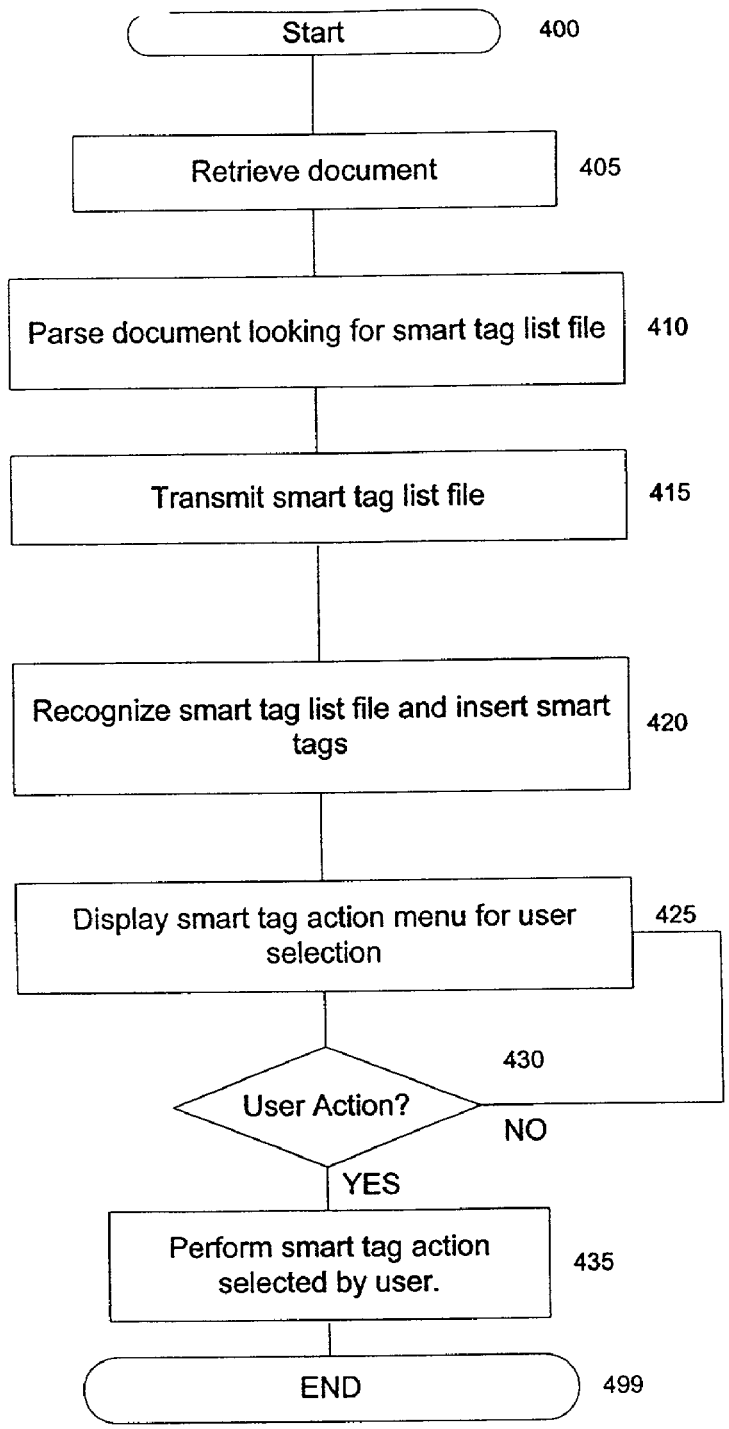
FIG. 4 is a flow chart diagram illustrating a method for incorporating and executing smart tags in an online document by an exemplary computing application in accordance with the present invention.

FIG. 4 shows a method for providing smart tags in requested online content. The method begins at step 400 and proceeds to step 405 where the content browser application 310 retrieves a document from content server 360 for processing by browser tag engine 330. In this embodiment, the document may be, for example, a web page. The method then proceeds to step 410.

At step 410, the browser helper object 320 parses the document for an indication of a smart tag list file. The indicator may consist of the smart tag list file itself embedded in the header of the online document (e.g., XML text embedded in HTML) or the indicator may consist of URL link pointing to the location of the smart tag list file in another location (such as in a directory on the content server or on another server). The method then proceeds to step 415.

At step 415, the browser helper object 320 transmits the smart tag list file received from the content server (or retrieved from the location specified by the URL in the document) to the recognizer/action handler 340. The recognizer/action handler 340 is a dynamic-link library (DLL) for recognizing and labeling the document with smart tags in the smart tag list file, and for associating the smart tags with the actions defined in the smart tag list file, retrieved from the content server. The method then proceeds to step 420.

At step 420, the recognizer/action handler uses the smart tag list file to recognize certain text strings in the document as smart tags as defined by the smart tag list file. The text strings are labeled so that they are distinguishable from surrounding content in that they may have a different format (such as being bracketed or underlined) and/or color. The method then proceeds to step 425.

At step 425, a participating user may interact with the smart tags by hovering a cursor over or clicking on a labeled string causing the recognition/action handler 340 to bring up a smart tag action menu. If the user selects an action from the menu at step 430, the recognition/action handler performs the smart tag action defined in the smart tag list file in step 435. The smart tag list file is stored in a temporary file on the client computing device and is available until the document containing the smart tag list file is closed or a new document is received from the content server by the client computing device. The method then ends at step 499.

Figure 5:
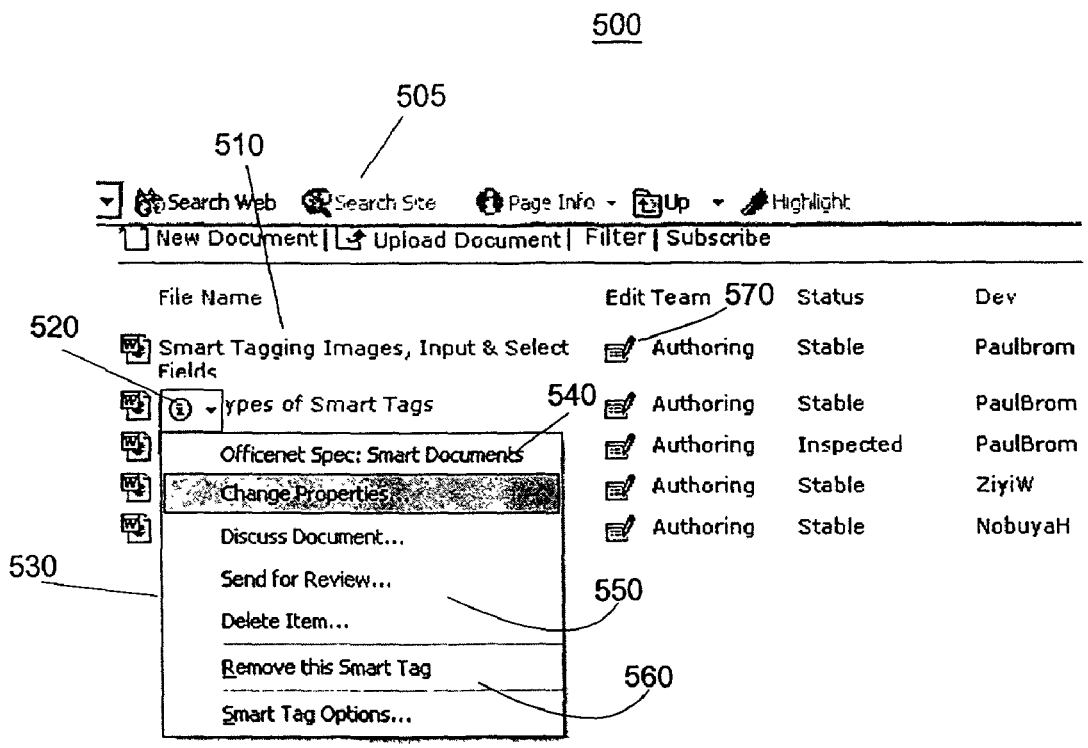
FIG. 5 is a block diagram of an exemplary screen shot of the exemplary computing application displaying smart tags for interaction in accordance with the present invention.

FIG. 5 shows an exemplary screen shot of an exemplary content browser application capable of displaying and executing smart tags. As shown, exemplary content browser application 500 maintains a first display pane 505 having a variety of content 510. Included in content 510 is smart tag 520. Smart tag 520 is distinguishable from surrounding content 510 by the presence of a button. Of course, other means may also be employed to distinguish smart tags such as underlining and/or using a different color. In an exemplary operation, participating users (not shown) interact with smart tag 520 through one or more user interfaces (not shown). In that event, exemplary computing application 500 processes the interaction and displays smart tag display pane 530. Smart tag display pane 530 is capable of displaying and executing a variety of content and operations. In the example provided, smart tag display pane 530 displays the name 540 of the smart tag 520. In addition, smart tag display pane 540 displays additional selections 550 for manipulating the document pointed to by the underlying interacted smart tag 520. Furthermore, the document offers the user additional options 560 such as removing the smart tag from the document or to view additional smart tag options relating to the underlying interacted smart tag.

In this example, a user wants to edit the properties of a specification document contained in a document library on a company website. When interacted with, the smart tag 520 triggers the generation of smart tag display pane 530. Contained within smart tag display pane 520 is the name of the smart tag and various selections which allow the user to perform various editing functions relating to the smart tagged document. Without smart tags, the user would edit the page by pressing edit button 570 to go to another web page which would be used to make the changes. The use of smart tags allows for faster interaction with the document and obviates the need for deploying dedicated edit buttons or buttons for common actions related to the document on the website.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of musicdata, one skilled in the art will recognize that the present invention is not limited to music, and that the methods of tailoring media to a user, as described in the present application may apply to any computing device or environment, such as a gaming console, handheld computer, portable computer, etc., whether wired or wireless, and may be applied to any number of such computing devices connected via a communications network, and interacting across the network.

Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

We claim:

1. A method for providing smart tags in an electronic document, comprising:
    receiving the electronic document from a content server, wherein the electronic document includes a smart tag list file, wherein the smart tag list file comprises one or more terms associated with a semantic category;
    parsing the received electronic document for the smart tag list file;
    recognizing the smart tag list file for incorporating a smart tag into the electronic document for display to participating users and; wherein the smart tag list file further comprises: a recognition component, the recognition component including a list of terms relevant to the content of the electronic document, wherein the terms are strings to be recognized as smart tags; and
    an action component, the action component including a plurality of actions relevant to the content of the electronic document, wherein the plurality of actions are actions that may be performed in reference to the smart tags.

2. The method of claim 1, wherein receiving the electronic document comprises receiving a web page.

3. The method of claim 1, wherein receiving the electronic document comprises receiving a word processing document.

4. The method of claim 1, wherein receiving the electronic document comprises receiving a spreadsheet.

5. The method of claim 1, further comprising:
displaying the smart tags which may be selected by the participating users through a cooperating display device; and
offering the actions that may performed in reference to the smart tags selected by the participating users through the cooperating display device.

6. The method of claim 5, further comprising:
performing the actions selected by the participating users through the cooperating display device; and
removing the smart tag list file in response to retrieving a new electronic document from the content server.

7. A system for providing smart tags in an electronic document, comprising:
a computing application residing on a client computer of a networked computing environment capable of receiving and displaying an electronic document from at least one computer server of the networked computing environment, wherein the electronic document includes an embedded smart tag list file, wherein the smart tag list file comprises one or more terms associated with a semantic category;
a helper object, the helper object cooperating with the computing application to parse the received electronic document for the smart tag list file;
a recognizer, cooperating with the helper object to incorporate at least one smart tag defined by the smart tag list file into the electronic document for display to participating users and; wherein the smart tag list file further comprises: a recognition component, the recognition component including a list of specified terms relevant to the content of the electronic document, wherein the terms are strings to be recognized as smart tags; and
an action component, the action component including a plurality of the one or more actions associated with the list of terms relevant to the content of the electronic document, wherein the plurality of one or more actions are actions that may be performed in reference to the smart tags.

8. The system of claim 7, further comprising at least one action handler, the action handler executing at least one pre-defined action.

9. The system of claim 7, wherein the computing application comprises a content browser computing application.

10. The system of claim 7, wherein the computing application comprises a word processing document.

11. The system of claim 7, wherein the computing application comprises a spreadsheet.

12. A computer-readable medium having computer-executable instructions for providing smart tags in an electronic document, comprising:
receiving the electronic document from a content server, wherein the electronic document includes a smart tag list file, wherein the smart tag list file comprises one or more terms associated with a semantic category;
parsing the received electronic document for a reference to the smart tag list file;
retrieving the smart tag list file based on the reference;
transmitting the smart tag list file to a recognizer for incorporating a smart tag into the electronic document for display to participating users and; wherein the smart tag list file further comprises: a recognition component, the recognition component including a list of terms relevant to the content of the electronic document, wherein the terms are strings to be recognized as smart tags; and
an action component, the action component including a plurality of actions relevant to the content of the electronic document, wherein the plurality of actions are actions that may be performed in reference to the smart tags.

13. The computer-readable medium of claim 12, wherein receiving the electronic document comprises receiving a web page.

14. The computer-readable medium of claim 12, wherein receiving the electronic document comprises receiving a word processing document.

15. The computer-readable medium of claim 12, wherein receiving the electronic document comprises receiving a spreadsheet.

16. The computer-readable medium of claim 14, further comprising:
displaying the smart tags which may be selected by the participating users through a cooperating display device; and
offering the actions that may performed in reference to the smart tags selected by the participating users through the cooperating display device.

17. The computer-readable medium of claim 12, wherein the reference to the smart tag list file comprises a URL link pointing to a location for the file.

18. The computer-readable medium of claim 16, further comprising:
performing the actions selected by the participating users through the cooperating display device; and
removing the smart tag list file in response to retrieving a new electronic document from the content server.

* * * * *

UNITED STATES PATENT AND TRADEMARK OFFICE
CERTIFICATE OF CORRECTION

PATENT NO. : 7,003,522 B1
APPLICATION NO. : 10/178680
DATED : February 21, 2006
INVENTOR(S) : Jeffrey C. Reynar et al.

It is certified that error appears in the above-identified patent and that said Letters Patent is hereby corrected as shown below:

On page 2, in item (56), under "Other Publications", in column 1, line 10, after "6," insert -- 1 --.

On page 2, in item (56), under "Other Publications", in column 1, line 17, delete "works" and insert -- work --, therefor.

On page 2, in item (56), under "Other Publications", in column 2, line 7, after "management" delete ":" and insert -- ; --, therefor.

In column 14, line 1, in Claim 12, after "readable" insert -- storage --.

In column 14, line 34, in Claim 16, delete "claim 14," and insert -- claim 12, --, therefor.

Signed and Sealed this

Eleventh Day of August, 2009

David J. Kappos
*Director of the United States Patent and Trademark Office*